United States Patent [19]
Liu

[11] Patent Number: 5,950,710
[45] Date of Patent: Sep. 14, 1999

[54] OVERHEAT REGULATING SYSTEM FOR VEHICLE PASSENGER COMPARTMENT

[75] Inventor: Chunyan Liu, Montville, N.J.

[73] Assignee: ContinOcean Tech Inc., Montville, N.J.

[21] Appl. No.: 08/976,285

[22] Filed: Nov. 21, 1997

[51] Int. Cl.[6] ............................................. F28F 27/00
[52] U.S. Cl. .................. 165/41; 165/46; 165/104.26; 62/244; 62/453
[58] Field of Search .................. 165/41, 46, 104.26, 165/104.33; 62/244, 452, 453

[56] References Cited

U.S. PATENT DOCUMENTS

| | | | |
|---|---|---|---|
| 2,895,313 | 7/1959 | Flick | 165/41 |
| 3,770,049 | 11/1973 | Wright | 165/41 |
| 4,274,479 | 6/1981 | Eastman | 165/104.26 |
| 4,702,225 | 10/1987 | Heffernan et al. | 165/104.26 X |
| 4,784,215 | 11/1988 | Sing | 165/41 |
| 4,907,644 | 3/1990 | Ghiraldi | 165/104.33 X |
| 4,909,044 | 3/1990 | Gudmundsen | 12/244 X |
| 4,921,043 | 5/1990 | Ghiraldi | 165/104.33 X |
| 4,974,667 | 12/1990 | Sun et al. | 165/41 |
| 4,986,343 | 1/1991 | Sing | 165/41 |
| 5,343,940 | 9/1994 | Jean | 165/46 X |
| 5,423,498 | 6/1995 | Fluegel | 165/41 X |
| 5,467,814 | 11/1995 | Hyman et al. | 165/41 |

FOREIGN PATENT DOCUMENTS

| | | | |
|---|---|---|---|
| 2139544 | 2/1973 | Germany | 62/244 |
| 0021441 | 2/1978 | Japan | 165/104.33 |
| 401056270 | 3/1989 | Japan | 164/41 |
| 0275294 | 11/1990 | Japan | 165/104.33 |

OTHER PUBLICATIONS

Water–Enhanced Selective Module Cooling For Air–Cooled Circuit Cards, IBM Technical Disclosure Bulletin, pp. 110–112, Jun. 1985.

*Primary Examiner*—Christopher Atkinson

[57] ABSTRACT

An overheat regulating system (10) for a passenger compartment (200) of a vehicle comprising at least one thermal conductor (2) containing a phase-change working substance (18) for cooling the overheated passenger compartment (200) automatically without consuming any man-made power when the vehicle is parked outdoor under direct sunshine. The thermal conductor (2) has three sections: an evaporator section (20), which is preferably attached to the inner surface of the roof panel (60) of the passenger compartment (200), a condenser section (22), which is preferably mounted on the top of the roof panel, and an adiabatic section (24), which connects the evaporator section (20) and the condenser section (22) continuously. A shielding slab (70) with open periphery is constructed on the roof panel to shield the condenser section from direct sunshine. The evaporator section (20) absorbs excess heat from the overheated vehicle passenger compartment and the absorbed heat vaporizes the working substance (18). The resulting difference in the vapor pressure between the evaporator section (20) and the condenser section (22) drives the vapor-phase working substance (18) from the evaporator section to the condenser section where the vapor-phase working substance (18) condenses, releasing the latent heat of condensation to the ambient air. A wick (16) lining on the inner surface of the thermal conductor (2) is optional to help the condensed working substance (18) return to the evaporator section (20).

21 Claims, 6 Drawing Sheets

OVERHEAT REGULATING SYSTEM FOR VEHICLE PASSENGER COMPARTMENT

BACKGROUND

1. Field of the Invention

This invention relates to regulating system for a vehicle passenger compartment and, more particularly, to an overheat regulating system which utilizes the latent heat of a phase-change substance circulating between the inside and the outside of the vehicle passenger compartment automatically and can be used to cool overheated passenger compartments of vehicles parked outdoor under direct sunshine in warm weathers without consuming any man-made power.

2. Description of Prior Arts

Entering a sweltering car parked outdoor under sunshine in summer has been an unpleasant and sometimes intolerable experience. The problem is most severe in the presence of direct sunshine due to the greenhouse effect. Experiments have shown that under direct sunshine and with a moderate ambient temperature such as 30° C. (86° F.), the temperature inside a conventional passenger car can easily reach as high as 60° C. (140° F.). There exist some air-conditioning systems in the prior arts which can cool the vehicle after the engine is started. However, none of them can solve the overheat problem effectively since they all need the power from the running engine, which is not available when the car is parked and the driver has left the car.

Conventional automotive air conditioning systems, such as the one described in "*Automotive Mechanics*" (William H. Crouse, McGraw-Hill 10th Ed., 1996), can effectively cool passenger chambers when engines are running. However, they do not function when automobiles are parked in a parking lot and the engines have stopped running since their compressors need to be powered by the running engines.

There exist some automobile air conditioning units in the prior arts which are different than the conventional air-conditioning systems, but none of them can function when the engines are not running. For example, U.S. Pat. No. 5,477,688 disclosed an automotive air conditioning apparatus utilizing the cooling source obtained from the isothermal expansion of gas in engine. In U.S. Pat. No. 4,051,692, an air-liquid heat-exchanger is used to absorb heat from automobile passenger chamber and release heat to the circulated liquid which is cooled by being sprayed through the air flow at the front of the automobile. The liquid is circulated by using a pump powered by the running engine of the automobile. In U.S. Pat. No. 4,761,967, a thermal storage tank is used to store the cooling energy generated from a conventional cooling circuit and the passenger room can be continuously cooled during the stoppage of the compressor. The cooling energy is transferred from the thermal storage tank to the passenger compartment by a pump which is powered by the running engine.

Another approach existing in the prior arts is to apply a sunlight-proof coating to the glass of car windows. This technique can not solve the problem satisfactorily since the front windshield and the driver-side window glass cannot be coated with the sunlight-proof material to avoid blocking the driver's sight. In addition, the coating can block only 10%–40% of the solar radiation.

OBJECTS AND ADVANTAGES

Accordingly, an object of the present invention is to overcome the problems in the prior art and design an overheat regulating system to cool vehicle passenger compartments overheated by direct sunshine due to the greenhouse effect. In particular, the overheat regulating system in the present invention is designed to significantly reduce the overheat of vehicle passenger compartments by transferring excess heat out to the ambient air without consuming any man-made power so that it can function well when vehicles are parked and engines are not running.

Another object of the present invention is to transfer excess heat at a high rate from the passenger compartments to the ambient air by using the latent heat of evaporation and condensation of a phase-change working substance. In the passenger compartments, the working substance in its liquid state absorbs heat from the passenger compartments and vaporizes. Outside the vehicle, the working substance in its vapor state releases heat to the ambient air and condenses. The overheat regulating system can function well even when the temperature difference between the inside and the outside of the passenger compartments is small.

The objects of the present invention also include designing an overheat regulating system for vehicle passenger compartments which can function automatically without employing any sensors or automatic control elements. The cooling effect of the overheat regulating system takes place automatically when the temperature in the compartment reaches the working temperature range of the working substance.

In addition, another object of the present invention is to design an overheat regulating system for vehicle passenger compartments with high flexibility and low manufacturing cost which can be installed on both existing and new vehicles.

The overheat regulating system for vehicle passenger compartments in this invention has the following advantages:

- it provides an overheat regulating system which can effectively reduce the overheat for vehicle passenger compartments without consuming any man-made power and can function well when the vehicle is parked and the engine is not running;
- it transfers excess heat out of vehicle passenger compartments at a high rate even when the temperature difference between the passenger compartment and the ambient air is small;
- it functions automatically without employing any sensors or automatic control elements;
- it is a highly reliable system since it does not employ any running mechanical or electrical parts;
- it is a simple, flexible and low-cost system;
- it can be installed on both existing vehicles and new vehicles.

SUMMARY OF THE INVENTION

In the present invention, the overheat regulating system for vehicle passenger compartments includes one or a bundle of thermal conductors. The thermal conductors of the overheat regulating system have three sections: an evaporator section, which is mounted inside the vehicle passenger compartment, a condenser section, which is mounted outside the vehicle passenger compartment where direct sunshine is absent and is exposed to the ambient air, and an adiabatic section, which connects the evaporator section and the condenser section continuously. The evaporator section is preferably attached to the interior surface of the roof panel of the vehicle passenger compartment. The condenser section is preferably mounted on the top of the roof panel of the vehicle and can easily exchange heat with the ambient air. A shielding slab with open periphery is constructed on the roof to shield the condenser section from direct sunshine.

Each of these thermal conductors further includes a containing tube, a porous capillary wick which lines on the inner surface of the containing tube, and a working substance which is filled in the inner space of the containing tube and can change its phase between vapor and liquid. Within the working temperature range of the working substance, the wick is saturated with the liquid-phase working substance, and the remaining hollow channel of the containing tube surrounded by the wick contains the vapor-phase working substance.

When a vehicle is parked under direct sunshine with windows closed and its air conditioner ceased working, the air temperature inside the vehicle passenger compartment increases beyond the ambient air temperature due to the greenhouse effect. At this time, there is a passive-solar-energy-potential-difference between the air inside the passenger compartment and the air outside the passenger compartment where there is no direct sunshine. For vehicles equipped with the overheat regulating system in this invention, the evaporator section of the thermal conductors absorbs excess heat from the overheated vehicle passenger compartment and the absorbed heat vaporizes the working substance in the evaporator section. The resulting difference in the vapor pressure between the evaporator section and the condenser section drives the vapor from the evaporator section to the condenser section where the vapor-phase working substance condenses, releasing the latent heat of condensation to the ambient air. Depletion of the liquid-phase working substance by evaporation in the evaporator section causes the liquid-vapor interface to enter deeper into the wick and a capillary pressure is developed at the liquid-vapor interface. The capillary pressure pumps the condensed liquid-phase working substance from the condenser section back to the evaporator section for supplying the continuous evaporation. Gravity also helps the return of the condensed liquid-phase working substance back to the evaporator section. As the working substance continues to circulate inside the thermal conductor and change its phase between liquid and vapor, the overheat regulating system driven by the passive-solar-energy-potential-difference, continuously transmits the phase-change latent heat from the passenger compartment to the ambient air without consuming any man-made power.

The transversal cross section of the thermal conductors can be flat oblong or round. One or a bundle of these thermal conductors can be installed on one vehicle and their evaporator section and condenser section are preferably imbedded in metal plates to enlarge the area of heat transfer. The quantity and the size of the tubes are determined by the required cooling capacity and the space available inside the passenger compartment.

The overheat regulating system aims at keeping the globe temperature of the passenger compartment under a set-point temperature, for example, 40° C. The working substance has a lower-end working temperature, for example 30° C., and a higher-end working temperature, for example 80° C. The melting-point temperature of the working substance must be below the lower-end working temperature and the critical-point temperature of the working substance must be above the higher-end working temperature. The set-point temperature should be around the boiling-point temperature of the working substance.

To prevent the heat from being transmitted from the ambient air back to the passenger compartment when the temperature inside the passenger compartment is lowered by a conventional vehicle air conditioner, a throttling valve is installed in the passage of the vapor-phase working substance in the adiabatic section. The arrangement allows unrestricted flow of the vapor-phase working substance from the evaporator section to the condenser section. The flow of the vapor-phase working substance in the reverse direction from the condenser section to the evaporator section shuts off the throttling valve.

The condenser section may also be installed beneath the bottom cover of the vehicle, eliminating the need for the shielding slab.

DRAWING FIGURES

REFERENCE NUMERALS IN DRAWINGS

| 100 | vehicle | 200 | passenger compartment |
|---|---|---|---|
| 2 | thermal conductors | 10 | overheat regulating system in the present invention |
| 14 | containing tube | 16 | wick |
| 18 | working substance | 20 | evaporator section |
| 22 | condenser section | 24 | adiabatic section |
| 26 | throttling valve | 28 | end caps |
| 28a | fill tube | 30 | metal plate for evaporator section |
| 32 | insulation for evaporator section | 34 | headliner |
| 36 | flange angles | | |
| 40 | metal plate for condenser section | 42 | flange angles |
| 46 | insulation for condenser section | 48 | layer of reflecting material |
| 50 | cover shell of shielding slab | 60 | roof panel |
| 62 | reinforcing ribs | 70 | shielding slab |
| 90 | vehicle body | 142 | flange angles |
| 152 | floor of passenger compartment | 156 | wheel-house |
| 168 | rear roof rail | 170 | rear fenders |
| 172 | rear pillars | 192 | bottom cover |

DESCRIPTION OF THE INVENTION

In this section, details of a preferred embodiment and an alternative embodiment of the present invention are described. The present invention is shown in FIGS. 1 to 8, and accordingly designated numerals in this "Description of the Invention" are the same as those in the figures.

Figure 1:
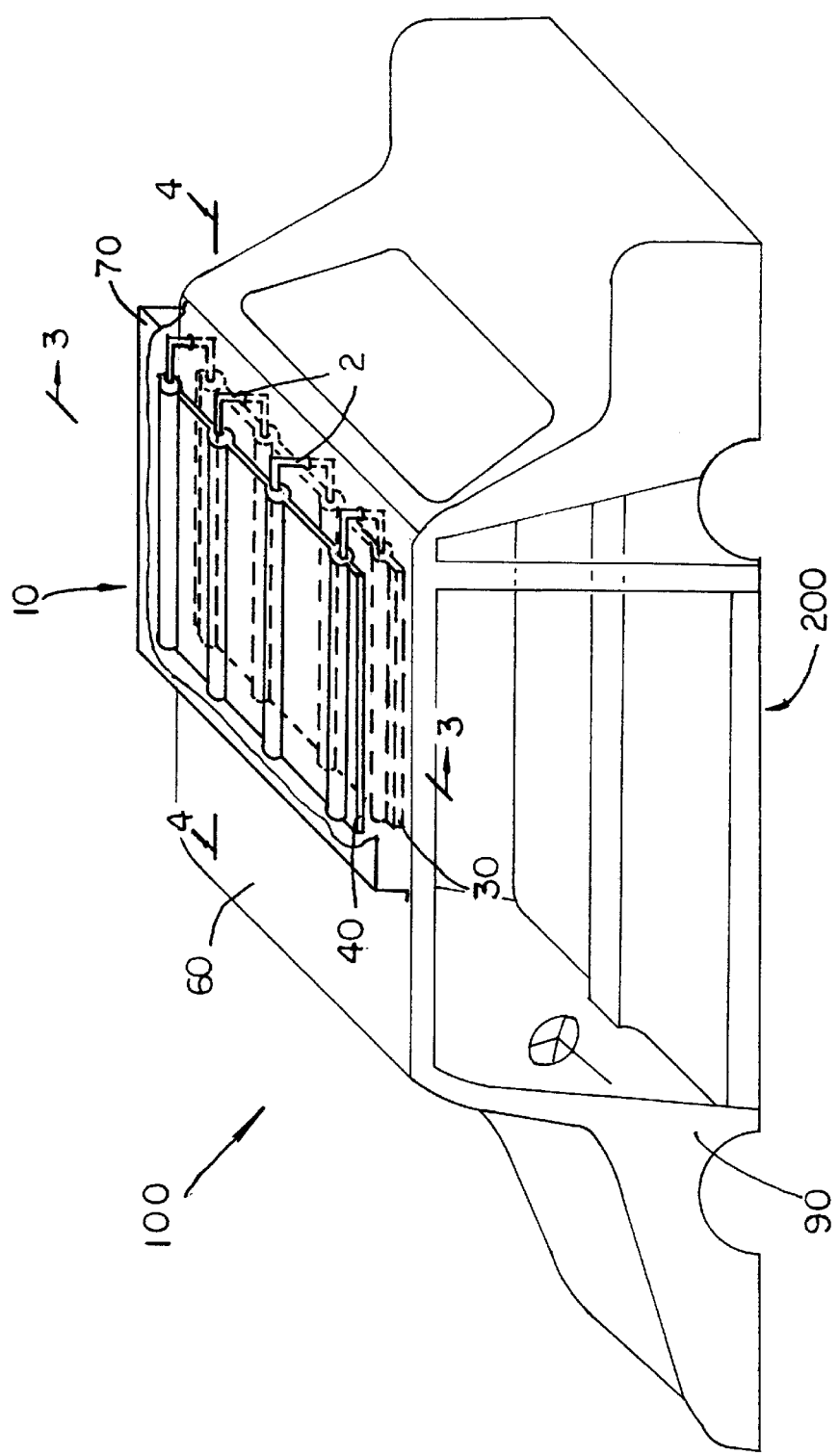
FIG. 1 is a perspective view of the preferred embodiment of the overheat regulating system for vehicle passenger compartment.

Referring to the drawings more particularly by reference numerals, FIGS. 1 to 5 shows a preferred embodiment of the present invention. A vehicle 100, its passenger compartment 200, and an overheat regulating system 10 in the present invention are shown in FIG. 1. This vehicle passenger compartment 200 is typically a car passenger compartment. It is understood that the present invention can be incorporated in passenger compartments of any type of vehicles.

Figure 3:
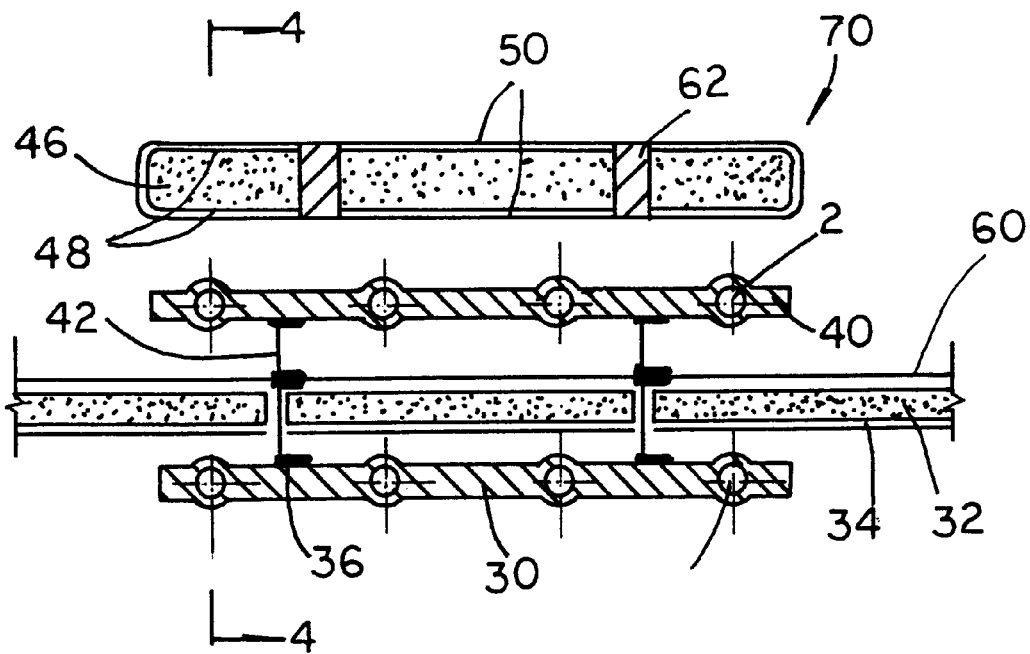
FIG. 3 is an elevation view of the overheat regulating system in section taken on line 3—3 in FIG. 1.
Figure 4:
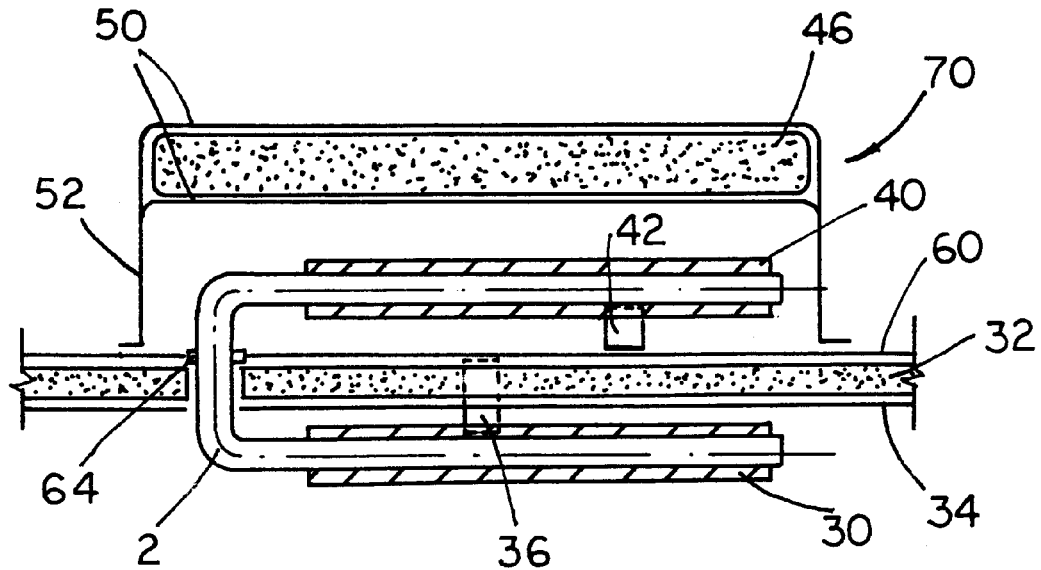
FIG. 4 is an elevation view of the overheat regulating system in section taken on line 4—4 in FIG. 1.

Referring to FIGS. 1, 3 and 4, the roof of the passenger compartment 200 includes a roof panel 60 with its interior surface lined by a thermal insulation layer 32 and headliner 34 for decoration and thermal insulation.

In warm or hot weathers, when the car 100 is parked under direct sunshine, for example, in a public parking lot, the temperature inside the passenger compartment 200 can easily reach 60° C. (140° F.) due to the greenhouse effect. The temperature near the car roof may even be as high as 70° C. It is extremely uncomfortable for people to enter the passenger compartment 200 at this time. The temperature outside the passenger compartment 200, especially under the shade of an object blocking the direct sunshine, however, is always lower then the temperature inside the passenger compartment 200.

Figure 2:
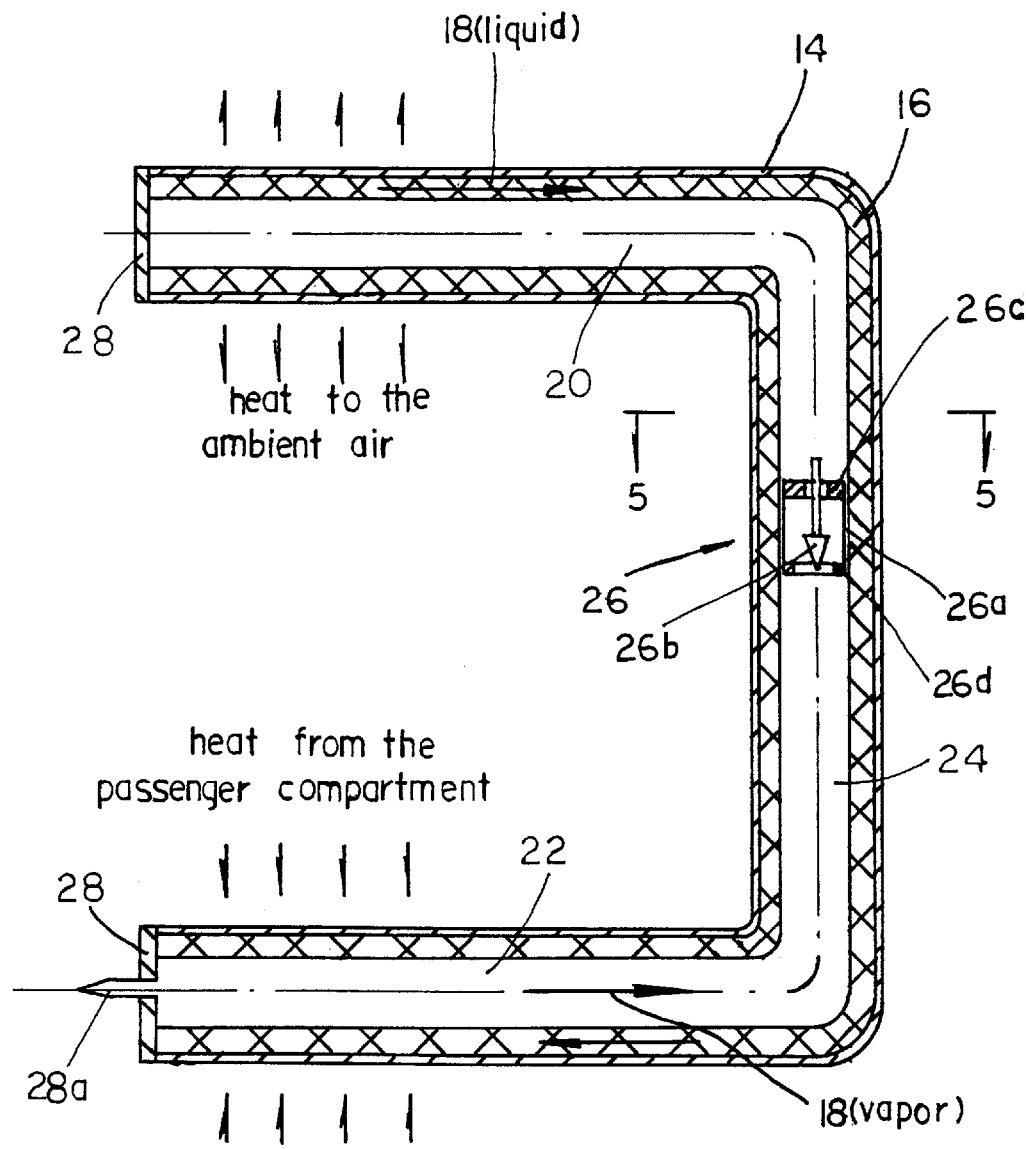
FIGS. 2 and 2A are an elevation view in detail of the thermal conductor.

As shown in FIGS. 1 and 2, the car 100 employing the overheat regulating system 10 in the present invention includes a bundle of thermal conductors 2. One part of the thermal conductors 2 are mounted inside the passenger compartment 200 and the other part of the thermal conductors 2 are mounted outside the passenger compartment 200. The thermal conductors 2 conducts excess heat from the passenger compartment 200 out to the ambient air. Each of the thermal conductors 2 has three sections. The first, an evaporator section 20, is mounted inside the vehicle passenger compartment to absorb heat from the passenger compartment. The second, a condenser section 22, is mounted outside the vehicle passenger compartment and exposed to the ambient air to dissipate heat to the ambient air. The third, an adiabatic section 24, connects the evaporator section 20 and the condenser section 22 and transports a working substance 18 between the evaporator section 20 and the condenser section 22.

Many methods may be used to increase the efficiency of heat transfer between the evaporator section 20 of the thermal conductors 2 and the air inside the passenger compartment 200 and between the condenser section 22 of the thermal conductors 2 and the ambient air. In this preferred embodiment, metal plates 30 and 40 with evenly spaced hollow channels made of aluminum by using extrusion are used to enlarge the heat transfer area of the thermal conductors 2. The evaporator section 20 and the condenser section 22 are imbedded in the hollow channels of the metal plates 30 and 40, respectively, by using mechanical expansion to create a tight interference fit.

Referring to FIGS. 1 to 4, embedded in the metal plate 30, the evaporator section 20 is preferably mounted beneath the car roof panel 60 by welding or screwing one side of each of a plurality of flange angles 36 to the inside of the car roof panel 60, and welding or screwing the other side of the flange angles 36 to the metal plate 30. Thermal insulation between the car roof panel 60 and the thermal conductors 2 is needed for the overheat regulating system to work properly. One may make use of the thermal insulation layer 32 and the headliner 34 of the passenger compartment 200 for this purpose.

The condenser section 22 should be placed at a location where the greenhouse effect and direct sunshine are absent and the temperature is lower than the temperature inside the passenger compartment. In this preferred embodiment, the condenser section 22 of the thermal conductors is installed on the top of the roof panel. Referring to FIGS. 1, 3 and 4, in order to shield the condenser section 22 from direct sunshine, a shielding slab 70 is installed on the top of the roof panel 60. The shielding slab 70 preferably has a cover shell 50 filled with insulating filler 46, such as fiber glass or foamed-in-place filler. The cover shell 50 is preferably made of the same material as the roof panel. To increase the thermal shielding efficiency, a thin layer of reflecting material 48, such as a layer of Reflectal or a layer of reflecting coating is preferably applied either to the surface of the insulating filler 46 or to the inside surface of the cover shell 50. Reinforcing ribs 62 are employed to increase the strength of the cover shell 50. At the front and the rear ends of the cover shell 50, the top and bottom panels of the cover shell 50 mesh with each other and form two flanges 52. The two flanges 52 are bent downward so that the shielding slab 70 has an arch shape. The condenser section 22 is covered by the shielding slab 70. The two flanges 52 are fastened on the roof panel 60. The side peripheries of the shielding slab 70 are open. The distance between the shielding slab 70 and the roof panel 60 is large enough to allow the free air flow to pass freely through the condenser section 22 of the thermal conductors 2. Under the arch of the shielding slab 70, the condenser section 22 of the thermal conductors 2 is attached to the roof panel 60 by welding or screwing one side of each of a plurality of flange angles 42 to the outside surface of the car roof panel 60, and welding or screwing the other side of the flange angles 42 to the metal plate 40. There should be clear space left at one side or both sides of the metal plate 40 to allow the ambient air to flow through. The metal plate 40 may also be attached to the bottom of the shielding slab 70 provided that the shield slab 70 is structurally strong enough.

Extended from the evaporator section 20, the adiabatic section 24 crosses the headliner 34, the thermal insulation layer 32 and the roof panel 60, continuously extends to the outside of the roof panel 60, and is connected with the condenser section 22 on the top of the roof panel 60. Leak-proof measures need to be taken to prevent the rain from leaking into the passenger compartment 200 through the joints between the roof panel 60 and the thermal conductors 2. As shown in FIG. 4, ring-seals 64 may be used for this purpose.

Figure 5:
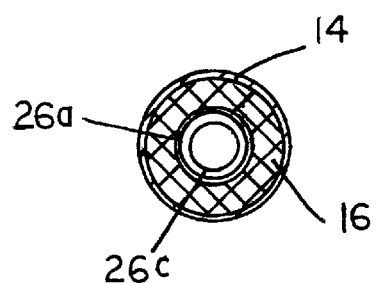
FIG. 5 is a plan view in detail of the portion of the thermal conductor indicated by section line 5–5 in FIG. 2.

Referring to FIGS. 2 and 5, each of the thermal conductors 2 includes a self-enclosed containing tube 14, a porous capillary wick 16 which lines preferably on the interior surface of the containing tube 14, and a working substance 18 which is filled in the inner space of the containing tube 14 and can change its phase between liquid and vapor. Within a working temperature range, preferably between 30° C. and 70° C., of the working substance 18, the wick 16 is saturated with the liquid-phase working substance 18 and the remaining hollow channel of the containing tube 14 contains the vapor-phase working substance 18.

When installed in a vehicle, the evaporator section 20 absorbs excess heat from the overheated passenger compartment 200 and the absorbed heat vaporizes the liquid-phase working substance 18. The resulting difference in vapor pressure between the evaporator section 20 and the condenser section 22 drives the vapor-phase working substance 18 from the evaporator section 20 to the condenser section 22 where the vapor-phase working substance 18 condenses, releasing the phase-change latent heat to the ambient air. Depletion of the liquid-phase working substance 18 by evaporation in the evaporator section 20 causes the liquid-vapor interface to enter deeper into the wick 16 and a capillary pressure is developed at the liquid-vapor interface. The capillary pressure pumps the condensed liquid-phase working substance 18 back to the evaporator section 20 for supplying the continuous evaporation. Gravity also helps the condensed liquid-phase working substance 18 return to the evaporator section 20. As the working substance 18 continues to circulate inside the thermal conductors 2 and change its phase between liquid and vapor, the overheat regulating system 10 continuously transmits the phase-change latent heat from the evaporator section 20 to the condenser section 22 without consuming any man-made power.

The material of the self-enclosed containing tubes 14 is preferably metal, for example, aluminum, for its low thermal resistance and good flexibility for easy installation. The shape of the containing tubes 14 is preferably round so that low-cost off-the-shelf pipes such as seamless or butt welded pipes can be used. End caps 28 are welded to both ends of the containing tubes after assembly of the wick 16. A fill tube 28a is used as an access to the thermal conductors 2 for evacuating air from the thermal conductors 2 and filling the working substance 18 into the thermal conductors 2 and is welded to one of the end caps 28. The tip of the fill tube 28a is closed and sealed preferably by a crimp seal after the working substance 18 is filled.

The capillary wick 16 has three functions in the overheat regulating system. The first function is to supply adequate capillary pumping pressure for the return of the condensed working substance 18 from the condenser section 22 to the evaporator section 20. The second function is to supply necessary flow paths for the liquid-phase working substance 18 to be transported from the condenser section 22 to the evaporator section 20. The third is to conduct heat between the inner wall of the containing tube 14 and the liquid-vapor interface. The use of the wick 16 to create capillary pressure allows the overheat regulating system to work without consuming any man-made power.

Figure 2A:
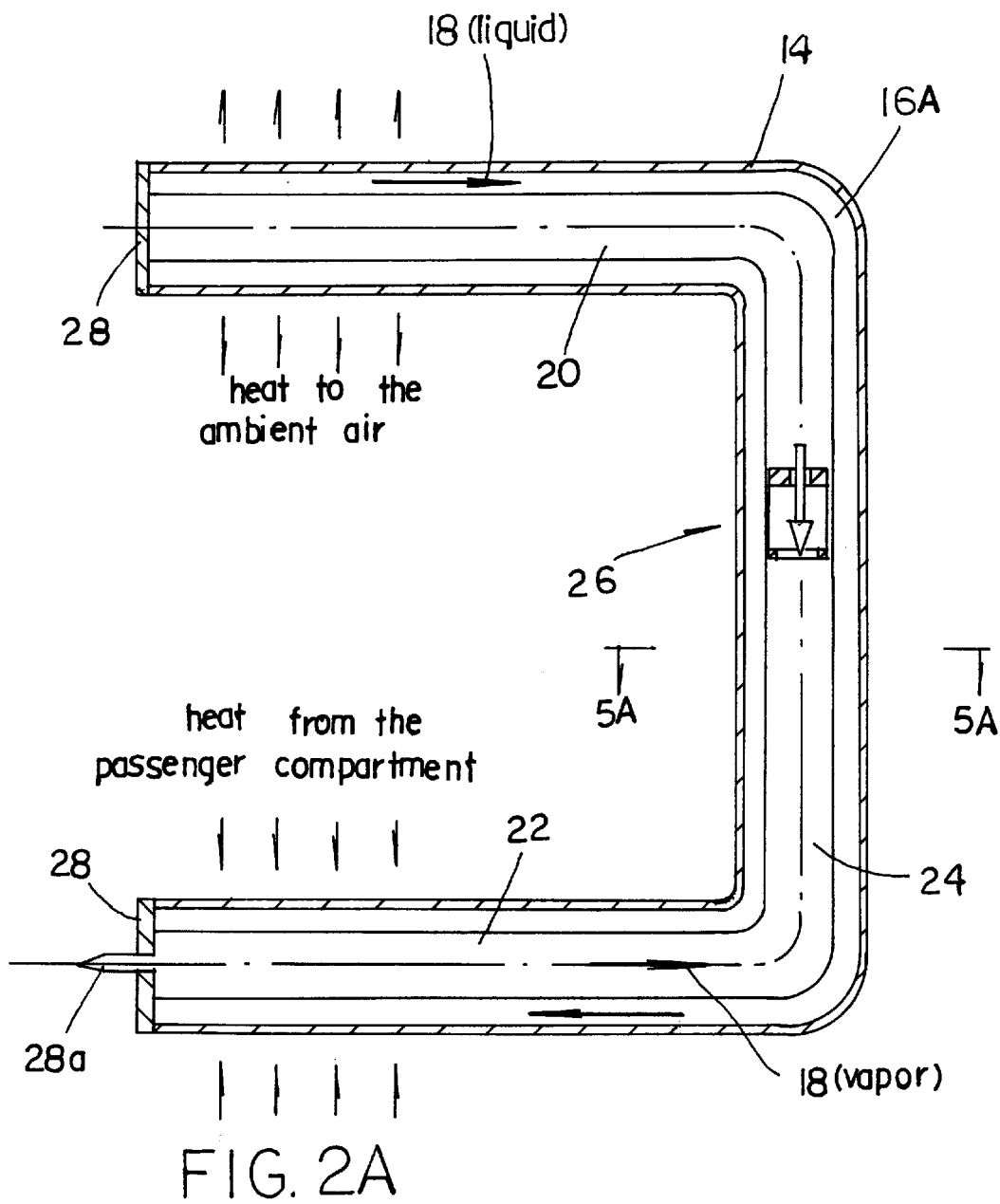
Figure 5A:
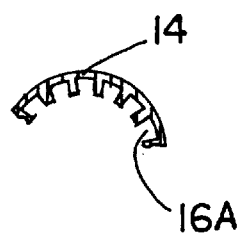
FIG. 5A is a detailed view of the thermal conductor with longitudinal grooves.

In this preferred embodiment, the capillary wick 16 is preferably longitudinal thin grooves more specifically shown as 16A in FIGS. 2A and 5A machined directly on the inner surface of the containing tube 14. The wick of this kind can guide the flow of the condensed working substance 18 under gravity and offers moderate capillary pumping pressure to help the return of the condensed working substance 18 to the evaporator section 20. It also has good thermal conductance and can effectively conduct heat between the inner wall of the containing tube 14 and the liquid-vapor interface of the working substance 18.

The overheat regulating system 10 aims at keeping the globe temperature of the passenger compartment 200 under a set-point temperature, for example, 40° C. The working substance 18 has a working temperature range, for example, between 30° C. and 70° C. The melting-point of the working substance must be below the lower-end of the working temperature range and the critical-point of the working substance must be above the higher-end of the working temperature range. The set-point temperature should be around the boiling-point of the working substance. The working substance 18 vaporizes in the overheated passenger compartment 200 and condenses in the condenser section 22 outside the passenger compartment 200. Pentane, Freon 11 or Freon 113 may be used as the working substance 18 since they have appropriate working temperature ranges, large heat transport factors and good liquid conductance factors.

When selecting the material for the working substance 18, the wick 16 and the containing tube 14, good compatibility among the containing tube 14, the working substance 18 and the wick 16 should be maintained.

Referring to FIGS. 2 and 5, To prevent the heat from being transmitted from the ambient air back to the passenger compartment 200 when the temperature inside the passenger compartment 200 is lowered by a conventional vehicle air conditioner, a throttling valve 26 is installed in the passage of the vapor-phase working substance 18 in the adiabatic section 24. The throttling valve 26 includes a valve cylinder 26a, a valve plunger 26b, a valve seat 26c and a valve out-port 26d. The valve cylinder 26a is the housing of the valve and has a diameter slightly less than the inner diameter of the wick 16. The throttling valve 26 is inserted into the hollow channel surrounded by the wick 16. The valve plunger 26b sits on the valve seat 26c and can move freely in the longitudinal direction of the thermal conductor 2. The flow of the vapor-phase working substance 18 from the evaporator section 20 to the condenser section 24 pushes the valve plunger 26b away from the out-port 26d so that the flow of the vapor-phase working substance 18 from the evaporator section 20 to the condenser section 24 is unrestricted. While the flow of the vapor-phase working substance 18 in the reverse direction from the condenser section 22 to the evaporator section 20 pushes the valve plunger 26c against the out-port 26d and shuts off the throttling valve 26.

Figure 6:
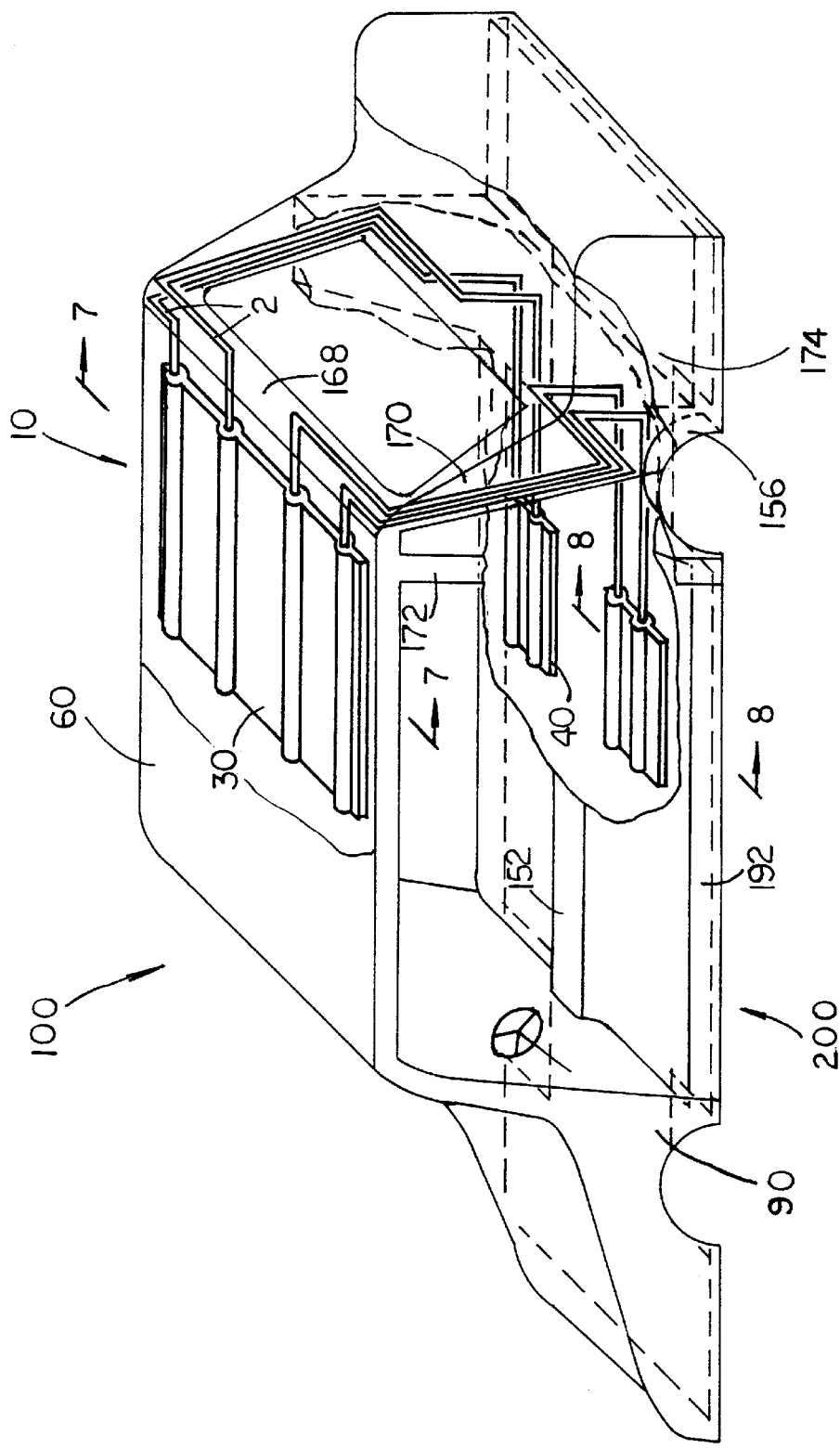
FIG. 6 is a perspective view of another embodiment of the overheat regulating system for vehicle passenger compartment.
Figure 7:
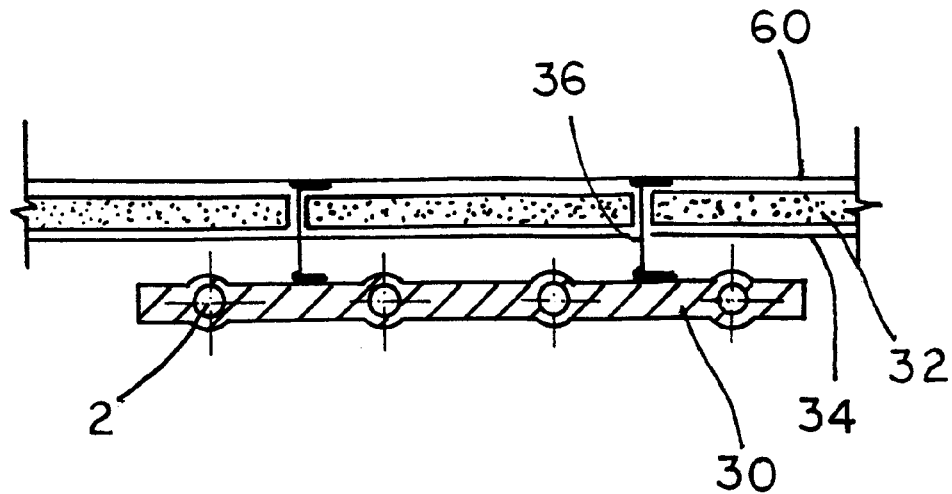
FIG. 7 is an elevation view of the portion indicated by the section line 7—7 in FIG. 6.

In addition to the preferred embodiment of this invention, as shown in FIG. 6, another mode of installation of the overheat regulating system 10 may also be arranged by mounting the condenser section 22 at the bottom part of the vehicle 100 outside the passenger compartment 200, which is always away from direct sunshine. The shielding slab 70 used in the preferred embodiment is not needed in this mode of installation. As shown in FIGS. 6 and 7, the structure and the fashion of mounting the evaporator section 20 is similar to the preferred embodiment described above.

Referring to FIG. 6, generally, the passenger compartment 200 is enclosed by a car body 90 which includes the roof panel 60, a rear roof rail 168, a floor panel 152, side panels 174, rear fenders 170, rear pillars 172, two pairs of wheelhouse 156 and others. The car body 90 is usually fastened on a car chassis. A bottom cover 192 is usually used to cover the vehicle mechanical systems. The parts of the car body 90 are usually made of metal or plastic composite material.

Figure 8:
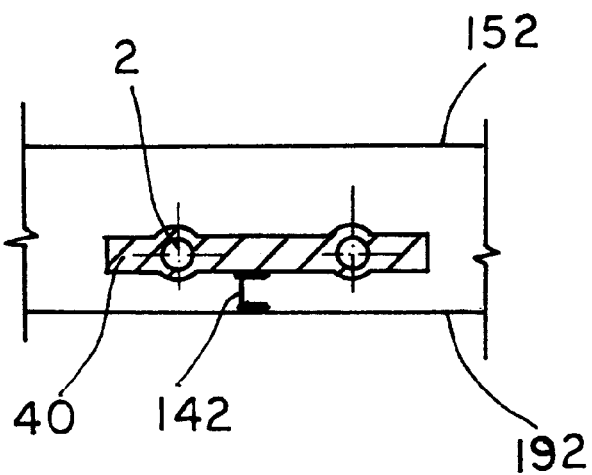
FIG. 8 is an elevation view of the portion indicated by the section line 8—8 in FIG. 6.

Referring to FIG. 8, embedded in the metal plate 40, the condenser section 22 is attached to the inside of the bottom cover 192 by welding or screwing one side of each of a plurality of flange angles 142 to the bottom cover 192 and welding or screwing the other side of the flange angles 142 to the metal plate 40. The condenser section 22 may also be attached to the bottom of the floor panel 152. The condenser section 22 may also be attached to the bottom of the bottom cover 192 to make use of the breeze of the ambient air to improve heat transfer efficiency.

The adiabatic section 24 of the thermal conductors is preferably bundled into a plurality of groups and crosses the vehicle body 90 at appropriate positions from the inside to the outside of the passenger compartment 200. When installing the adiabatic section 24 of the thermal conductors 2, one should make use of the existing structure and space of the vehicle to accommodate and cover the thermal conductors 2 and connect the evaporator section 20 to the condenser section 22 with the possibly shortest distance and the fewest turns. Coming out of the metal plate 30, the thermal conductors 2 cross the roof panel 60 from the front to the rear bottom of the insulation layer 32.

When they reach the rear end of the roof panel 60, they are curved and pinned along the rear roof rail 168 and rear fenders 170, heading down to the bottom part of the vehicle 100. Depending on the space available, the thermal conductors 2 may be separated into two or more groups and cross the passenger compartment 200 from the top of the passenger compartment 200 down to the bottom of the floor panel 152 along the two rear fenders 170. One may also use the two rear pillars 172 to accommodate the installation. Once the thermal conductors 2 extrude out of the passenger compartment 200, they may stretch to the bottom of the floor panel 152 in different directions depending on where the condenser section is installed. The thermal conductors 2 should be contained inside the side panels 174 and should not extrude into the wheel houses 156. A reasonable distance should be kept between the thermal conductors 2 and the vehicle's major mechanical parts, such as the driving train, suspension members and exhaust pipe. The thermal conductors 2 may be laid along the bottom of the floor panel 152 and stretch to the space where the condenser section 22 is installed. The thermal conductors 2 may also cross the space between the compartment floor 152 and the bottom cover 192 and stretch to the inside surface of the bottom cover 192 or the bottom of the bottom cover 192 where the condenser section is installed. No matter how the adiabatic section 24 is laid out, the thermal conductors 2 should always be pinned between the car body 90 and the car's upholstery lining.

In this alternative embodiment, wrapped metal screen is suitable to be used as the wick 16. The wick of this kind offers good capillary pumping pressure for the return of the condensed working substance 18 to the evaporator section 20. It also has moderate thermal conductance and can fairly effectively conduct heat between the inner wall of the containing tube 14 and the liquid-vapor interface of the working substance 18. The cloth of the wick 16 is preferably wrapped on a mandrel and inserted into the containing tube 14. The total diameter of the coiled wick 16 should be only slightly less than the inside diameter of the containing tube 14 and the residual stress in the coiled wick 16 forces the wick 16 against the inner surface of the containing tube 14 such that the wick 16 has a tight contact with the inner surface of the containing tube 14 and cannot move freely inside the containing tube 14.

In the preferred embodiment and the alternative embodiment described above, the thermal conductor 2 may be a flat slab with an oblong transversal cross section instead of a round tube. In this embodiment, one thermal conductor 2 may be enough for cooling the passenger compartment 200. It is optional to embed the thermal conductor 2 in the metal plates 30 and 40. The structure and installation of the thermal conductor 2 are the same as those in the preferred embodiment described before.

Although the description above contains many specifics, these should not be construed as limiting the scope of the invention but as merely providing illustrations of some of the presently preferred embodiments of this invention. Changes and modifications may be made within this invention as will be obvious to persons with ordinary skill. Such changes and modifications and substitutions of equivalents are within the scope and teaching of this invention as defined in the claims as appended hereto.

What is claimed is:

1. An overheat regulating system comprising:
 a) a passenger compartment enclosed by a body of a vehicle with a roof panel;
 b) at least one thermal conductor with a containing envelope containing a phase-change working substance and further comprising:
  i) an evaporator section located under said roof panel, where said phase-change working substance evaporates to a vapor-phase working substance,
  ii) a condenser section located above said roof panel outside said passenger compartment, where said phase-change working substance condenses to a liquid-phase working substance,
  iii) an adiabatic section connecting said evaporator section and said condenser section continuously,
 c) a thermal shielding means installed on the top of said roof panel to shield said condenser section from direct sunshine and to allow the ambient air to flow freely through said condenser section,
 wherein said thermal conductor is used to cool said passenger compartment by utilizing evaporation and condensation of said working substance driven by a passive-solar-energy-potential-difference existing between the air inside said passenger compartment and the ambient air under said thermal shielding means.

2. The overheat regulating system as defined in claim 1 wherein:
 said containing envelope of said thermal conductor includes a plurality of longitudinal thin grooves located on the inner side of said containing envelope, and said vapor-phase working substance travels from said evaporator section through a hollow channel surrounded by said longitudinal thin grooves to said condenser section, and condenses and releases heat to the ambient air at said condenser section, and said liquid-phase working substance returns to said evaporator section guided by said longitudinal thin grooves under gravity and evaporates and absorbs heat at said evaporator section.

3. The overheat regulating system as defined in claim 1 wherein:
 said thermal shielding means is constructed by a hollow slab filled with thermal insulation material.

4. The overheat regulating system as defined in claim 1 wherein:
 said thermal shielding means is constructed by a hollow slab filled with thermal insulation material and at least one layer of reflecting material sandwiched between said thermal insulation material and said hollow slab to increase the thermal resistance of said thermal shielding means.

5. The overheat regulating system as defined in claim 1 wherein:
 said evaporator section is embedded in a first metal plate and said condenser section is embedded in a second metal plate to enlarge total heat transfer area.

6. The overheat regulating system as defined in claim 5 wherein:
 said first metal plate and said second metal plate are made of aluminum by extrusion and have evenly spaced hollow channels to hold said thermal conductor.

7. The overheat regulating system as defined in claim 1 wherein:
 said thermal conductor is a self-enclosed tube having predetermined dimensions and shapes and filled with said phase-change working substance.

8. The overheat regulating system as defined in claim 1 wherein:
 said thermal conductor is a self-enclosed flat slab with an oblong transversal cross section and filled with said phase-change working substance.

9. The overheat regulating system as defined in claim 1 wherein:
 said thermal conductor has good flexibility so that said thermal conductor can be bent for installation without impairing said thermal conductor.

10. The overheat regulating system as defined in claim 1 wherein:

said adiabatic section of said thermal conductor includes a throttling valve to prevent undesired heat from being transmitted from the ambient air to said passenger compartment via said thermal conductor when the temperature inside said passenger compartment is lower than the temperature of the ambient air.

11. The overheat regulating system as defined in claim 1 wherein:

said overheat regulating system has a setpoint temperature for said passenger compartment and has a working temperature range between a lower-end working temperature and a higher-end working temperature, and said phase-change working substance has a melting-point which is below said lower-end working temperature, and has a critical-point which is above said higher-end working temperature, and has a boiling-point which is around said setpoint temperature.

12. An overheat regulating system comprising:

(a) a passenger compartment enclosed by a body of a vehicle with a roof panel and a bottom cover panel;

(b) at least one thermal conductor with a self-enclosed tube containing a phase-change working substance and further comprising:

(i) an evaporator section, installed inside said passenger compartment, where said phase-change working substance evaporates to a vapor-phase working substance;

(ii) a condenser section, installed on the bottom of said bottom cover panel, outside said passenger compartment and away from direct sunshine, where said phase-change working substance condenses to a liquid-phase working substance;

(iii) an adiabatic section connecting said evaporator section and said condenser section continuously, and crossing said vehicle from the top of said vehicle down to the bottom of said bottom cover panel within the enclosure of said body of said vehicle;

wherein said thermal conductor is used to cool said passenger compartment by utilizing evaporation and condensation of said working substance driven by a passive-solar-energy-potential-difference existing between the air inside said passenger compartment and the ambient air in absence of direct sunshine.

13. The overheat regulating system as defined in claim 12 wherein:

said evaporator section is attached to the interior surface of said roof panel.

14. The overheat regulating system as defined in claim 12 wherein:

said thermal conductor includes a wick layer which lines on the inner surface of said self-enclosed tube of said thermal conductor, and said vapor-phase working substance travels from said evaporator section through a hollow channel surrounded by said wick layer to said condenser section, and condenses and releases heat to the ambient air at said condenser section, and said liquid-phase working substance returns to said evaporator section under capillary pressure developed in said wick layer and evaporates and absorbs heat at said evaporator section.

15. The overheat regulating system as defined in claim 12 wherein:

said evaporator section is embedded in a first metal plate and said condenser section is embedded in a second metal plate to enlarge total heat transfer area.

16. The overheat regulating system as defined in claim 12 wherein:

said adiabatic section of thermal conductor includes a throttling valve to prevent undesired heat from being transmitted from the ambient air to said passenger compartment via said thermal conductor when the temperature inside said passenger compartment is lower than the temperature of the ambient air.

17. An overheat regulating system comprising:

(a) a passenger compartment enclosed by a body of a vehicle with a roof panel and a floor panel of said passenger compartment;

(b) at least one thermal conductor with a self-enclosed tube containing a phase-change working substance and further comprising:

(i) an evaporator section, installed inside said passenger compartment, where said phase-change working substance evaporates to a vapor-phase working substance, (ii) a condenser section, installed on the bottom of said floor panel outside said passenger compartment away from direct sunshine, where said phase-change working substance condenses to a liquid-phase working substance, (iii) an adiabatic section connecting said evaporator section and said condenser section continuously, and crossing said vehicle from the top of said vehicle down to the bottom of said floor panel within the enclosure of said body of said vehicle, wherein said thermal conductor is used to cool said passenger compartment by utilizing evaporation and condensation of said working substance driven by a passive-solar-energy-potential-difference existing between the air inside said passenger compartment and the ambient air in absence of direct sunshine.

18. The overheat regulating system as defined in claim 17 wherein:

said evaporator section is attached to the interior surface of said roof panel.

19. The overheat regulating system as defined in claim 17 wherein:

said thermal conductor includes a wick layer which lines on the inner surface of said self-enclosed tube of said thermal conductor, and said vapor-phase working substance travels from said evaporator section through a hollow channel surrounded by said wick layer to said condenser section, and condenses and releases heat to the ambient air at said condenser section, and said liquid-phase working substance returns to said evaporator section under capillary pressure developed in said wick layer and evaporates and absorbs heat at said evaporator section.

20. The overheat regulating system as defined in claim 17 wherein:

said adiabatic section of said thermal conductor includes a throttling valve to prevent undesired heat from being transmitted from the ambient air to said passenger compartment via said thermal conductor when the temperature inside said passenger compartment is lower than the temperature of the ambient air.

21. The overheat regulating system as defined in claim 17 wherein:

said evaporator section is embedded in a first metal plate and said condenser section is embedded in a second metal plate to enlarge total heat transfer area.

* * * * *